(12) United States Patent
Sakai et al.

(10) Patent No.: US 10,586,988 B2
(45) Date of Patent: Mar. 10, 2020

(54) ELECTRODE STRUCTURAL BODY AND PRODUCTION METHOD THEREOF

(71) Applicant: Kureha Corporation, Tokyo (JP)

(72) Inventors: Yuki Sakai, Tokyo (JP); Emi Sugawara, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 15/559,100

(22) PCT Filed: Apr. 13, 2016

(86) PCT No.: PCT/JP2016/061932
§ 371 (c)(1),
(2) Date: Sep. 18, 2017

(87) PCT Pub. No.: WO2016/167294
PCT Pub. Date: Oct. 20, 2016

(65) Prior Publication Data
US 2018/0248193 A1     Aug. 30, 2018

(30) Foreign Application Priority Data

Apr. 16, 2015 (JP) ................. 2015-084510

(51) Int. Cl.
| | | |
|---|---|---|
| H01M 4/62 | (2006.01) | |
| H01M 4/04 | (2006.01) | |
| H01M 4/13 | (2010.01) | |
| H01M 4/02 | (2006.01) | |
| H01M 4/36 | (2006.01) | |
| H01M 4/66 | (2006.01) | |
| H01M 4/139 | (2010.01) | |
| H01M 10/0525 | (2010.01) | |
| H01M 10/052 | (2010.01) | |
| C08F 214/22 | (2006.01) | |
| C09D 127/16 | (2006.01) | |
| C09D 5/24 | (2006.01) | |

(52) U.S. Cl.
CPC ......... *H01M 4/623* (2013.01); *C08F 214/225* (2013.01); *C09D 5/24* (2013.01); *C09D 127/16* (2013.01); *H01M 4/0404* (2013.01); *H01M 4/0471* (2013.01); *H01M 4/364* (2013.01); *H01M 4/661* (2013.01); *H01M 10/0525* (2013.01); *H01M 10/052* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2010/0133482 A1 | 6/2010 | Abusleme et al. | |
| 2013/0065138 A1* | 3/2013 | Takahata ............... | H01M 4/133 429/338 |
| 2013/0209879 A1* | 8/2013 | Nagai ................... | H01M 4/131 429/211 |
| 2013/0273424 A1 | 10/2013 | Watanabe et al. | |
| 2014/0120269 A1 | 5/2014 | Abusleme et al. | |
| 2014/0329003 A1* | 11/2014 | Fouda Onana ......... | B05D 5/12 427/58 |
| 2015/0083975 A1 | 3/2015 | Yeou et al. | |
| 2015/0147462 A1 | 5/2015 | Inaba et al. | |
| 2016/0289439 A1 | 10/2016 | Nagasawa et al. | |

FOREIGN PATENT DOCUMENTS

| | | |
|---|---|---|
| CN | 102380257 A | 3/2012 |
| CN | 102918687 A | 2/2013 |
| CN | 103155239 A | 6/2013 |
| CN | 103261247 A | 8/2013 |
| CN | 103620819 A | 3/2014 |
| EP | 2660254 | 11/2013 |
| JP | H07201315 A | 8/1995 |
| JP | H0997603 A | 4/1997 |
| JP | H09161804 A | 6/1997 |
| JP | 2010287470 A | 12/2010 |
| JP | 2012219125 A | 11/2012 |
| JP | 2014-520378 A | 8/2014 |
| JP | 2015072788 A | 4/2015 |
| JP | 2015103464 A | 6/2015 |
| KR | 2012-113659 A | 10/2012 |
| KR | 2013-0109185 A | 10/2013 |
| KR | 2015-0033439 A | 4/2015 |
| WO | WO2008129041 A1 | 10/2008 |
| WO | 2012028045 | 3/2012 |
| WO | WO2012090876 A1 | 7/2012 |
| WO | WO2013092446 A1 | 6/2013 |
| WO | WO2014002936 A1 | 1/2014 |

OTHER PUBLICATIONS

International Search Report for PCT/JP2016/061932 dated Jul. 5, 2016.
1st Office Action for KR Application No. 10-2017-7022889, dated Sep. 3, 2018, 21 pgs.
1st Office Action for JP2017-512566, dated Jun. 5, 2018 with translation.
Search report for European Application No. 16780085.3, dated Mar. 28, 2018, 8 pgs.
International Preliminary Report on Patentability for PCT/JP2016/061932 dated Oct. 26, 2017.
1st Office Action for JP2017-512566, dated Jun. 12, 2018 with translation.
Office Action for JP Patent Application No. 2017-512566 dated Dec. 4, 2018, 7 pgs.
Office Action for CN Patent Application No. 201680011528.6, dated Dec. 26, 2019, 14 pgs.

\* cited by examiner

*Primary Examiner* — Sin J Lee
(74) *Attorney, Agent, or Firm* — Abel Schillinger, LLP

(57) ABSTRACT

In an electrode structural body, a coated film is obtained by applying an electrode mixture including an electrode active material, a first fluorine based polymer, and a solvent and drying the mixture, then formed on the surface of a current collector, the first fluorine based polymer has one or more side chains represented by the following Formula (1), and the coated film is subjected to heat treatment.

—X—COOH          (1)

(In Formula (1), X is an atomic group having a molecular weight of less than 500, the main chain of which is made up of 1 to 20 atoms).

10 Claims, No Drawings

ELECTRODE STRUCTURAL BODY AND PRODUCTION METHOD THEREOF

TECHNICAL FIELD

The present invention relates to an electrode structural body, wherein a coated film is obtained by applying an electrode mixture including an electrode active material, a first fluorine based polymer, and a solvent and drying the mixture, then formed on the surface of a current collector, and the production method thereof.

BACKGROUND ART

In the related art, fluorine based polymers including polyvinylidene fluoride (PVDF) having superior electrochemical stability and chemical resistance have been used as electrode binders of nonaqueous electrolyte secondary batteries. Electrode binders play a role in holding active materials in a current collector and are required to have adhesion to a metal foil as well as binding capacity between active materials. Generally, PVDF, and the like has poor adhesion to metal, and depending on the active materials used, higher binding properties between active materials are desired.

Consequently, in order to improve these capacities as a binder, methods for copolymerizing vinylidene fluoride, and the like with other monomers have been developed.

Patent Document 1 discloses a vinylidene fluoride based copolymer obtained by copolymerizing vinylidene fluoride with a certain kind of unsaturated carboxylic acid.

Patent Document 2 discloses a vinylidene fluoride based copolymer obtained by copolymerizing vinylidene fluoride with certain kinds of hydrophilic acrylic monomers.

Patent Document 3 discloses that olivine type lithium phosphate, a fluorine resin having a crosslinkable functional group, a crosslinking agent, and a cathode electrode mixture slurry containing an organic solvent are applied onto the surface of a current collector, then heated to improve the adhesion between the current collector and the olivine type lithium phosphate, with at least one selected from the group consisting of alkylamine, aromatic amine, lithium hydroxide, and sodium carbonate used as the crosslinking agent.

Patent Document 4 discloses an electrode binder of a secondary battery using a nonaqueous electrolyte solution containing a fluorine-containing ethylenic polymer having a functional group obtained by copolymerizing, with respect to the total amount of fluorine-containing ethylenic monomers, 0.05 to 30 mol % of at least one fluorine-containing ethylenic monomer having a functional group having any one of: a hydroxyl group; a carboxyl group; a carboxylic salt, or a carboxy ester group; and an epoxy group.

Patent Document 5 discloses that an electrode binder obtained by thermally crosslinking polyvinylidene fluoride having a hydroxyl group with a polymer having an isocyanate group is used as an electrode binder.

Moreover, Patent Document 6 discloses, in a method for producing a battery electrode sheet by coating an electrode agent on a current collector, a method for producing a battery electrode sheet involving at least a pressing step after coating the electrode agent on the current collector and drying it, along with a step of subjecting it to heat treatment.

CITATION LIST

Patent Literature

Patent Document 1: WO 2012/090876 A1 (published on Jul. 5, 2012)

Patent Document 2: WO 2008/129041 A1 (published on Oct. 30, 2008)

Patent Document 3: JP-A-2010-287470 (published on Dec. 24, 2010)

Patent Document 4: JP-A-9-161804 (published on Jun. 20, 1997)

Patent Document 5: JP-A-7-201315 (published on Aug. 4, 1995)

Patent Document 6: JP-A-9-97603 (published on Apr. 8, 1997)

SUMMARY OF INVENTION

Technical Problem

Because nonaqueous electrolyte secondary batteries are repeatedly charged and discharged, it is desirable to improve the adhesion of fluorine based polymers to metal, along with the binding properties between active materials, in order to extend the cycle life.

Moreover, fluorine based polymers tend to have inferior adhesion particularly to active materials having a large specific surface area rather than to active materials having a small specific surface area.

Thus, the present invention has been completed in light of the abovementioned problems, with the object of providing a method that easily improves adhesion even for the case in which an active material having a large specific surface area is used, and an electrode structural body produced by the method.

Solution to Problem

In an electrode structural body according to the present invention, a coated film is obtained by applying an electrode mixture including an electrode active material, a first fluorine based polymer, and a solvent and drying the mixture, then formed on the surface of a current collector, the first fluorine based polymer has one or more side chains represented by the following Formula (1), and the coated film is subjected to heat treatment.

$$-\text{X}-\text{COOH} \qquad (1)$$

(In Formula (1), X is an atomic group having a molecular weight of less than 500, the main chain of which is made up of 1 to 20 atoms.)

A method for producing an electrode structural body according to the present invention includes: a step of applying an electrode mixture including an electrode active material, a first fluorine based polymer, and a solvent onto the surface of a current collector and drying the mixture, to form a coated film on the surface of the current collector; and a step of subjecting the coated film after drying to heat treatment, wherein the first fluorine based polymer has one or more side chains represented by the following Formula (1).

$$-\text{X}-\text{COOH} \qquad (1)$$

(In Formula (1), X is an atomic group having a molecular weight of less than 500, the main chain of which is made up of 1 to 20 atoms.)

Advantageous Effects of Invention

According to one aspect of the present invention, a method that easily improves adhesion even for the case in which an active material having a large specific surface area is used, and an electrode structural body produced by the method, can be obtained.

DESCRIPTION OF EMBODIMENTS

Hereinafter, embodiments of the present invention will be described in detail.

In an electrode structural body according to the present invention, a coated film is obtained by applying an electrode mixture including an electrode active material, a first fluorine based polymer, and a solvent and drying the mixture, then formed on the surface of a current collector, the first fluorine based polymer has one or more side chains represented by the following Formula (1), and the coated film is subjected to heat treatment.

—X—COOH (1)

In Formula (1), X is an atomic group having a molecular weight of less than 500, the main chain of which is made up of 1 to 20 atoms.

Here, the atomic number of the main chain of X refers to the atomic number of the skeleton portion of the chain that binds a carboxyl group and the main chain of a first fluorine based polymer by the lowest atomic number.

Note that in this embodiment, a "fluorine based polymer," which is the term used for the first fluorine based polymer and the second fluorine based polymer, refers to a polymer which is prepared by polymerizing one or more monomers (fluorine based monomers) including one or more monomers containing fluorine. The fluorine based polymer may be a homopolymer prepared by polymerizing only one fluorine based monomer or may be a copolymer prepared by polymerizing multiple kinds of monomers containing fluorine based monomers.

While not limited thereto, examples of fluorine based monomers include vinylidene fluoride, vinyl fluoride, trifluoroethylene, tetrafluoroethylene, chlorotrifluoroethylene, hexafluoropropylene, perfluoroalkyl vinyl ethers represented by perfluoromethyl vinyl ether, and the like. Moreover, while not limited thereto, examples of monomers that are copolymerizable with the fluorine based monomers include ethylene, propylene, (meth)acrylic acid, and alkyl (meth)acrylate compounds represented by methyl(meth) acrylate.

Electrode Mixture

The electrode mixture in this embodiment contains a first fluorine based polymer, an electrode active material, and a solvent. The electrode mixture in this embodiment preferably further contains a second fluorine based polymer. The electrode mixture is in the form of a slurry and may be adjusted to the desired viscosity when the amount of the solvent is appropriately adjusted. Note that the electrode mixture may be used as a cathode electrode mixture or an anode electrode mixture by changing the kind of electrode active material, and the like depending on the kind of current collector to be applied, and the like.

First Fluorine Based Polymer

The first fluorine based polymer contained in the electrode mixture in this embodiment includes one or more side chains represented by the abovementioned Formula (1).

In Formula (1), X is an atomic group having a molecular weight of less than 500, the main chain of which is made up of 1 to 20 atoms.

The molecular weight of the atomic group represented by X is less than 500, preferably less than 400, more preferably less than 350. Moreover, while the lower limit of the molecular weight is not particularly limited, it is normally 14. Note that the molecular weight of X is preferably within the abovementioned range from the viewpoint of polymerizability. Moreover, the main chain of X is made up of 1 to 20 atoms, preferably 2 to 15 atoms, more preferably 2 to 9 atoms.

While X may contain an oxygen atom or a nitrogen atom, it preferably contains an oxygen atom for the case in which X contains the abovementioned atom.

Specific examples of such side chains represented by Formula (1) include side chains represented by the following Formula (2).

—COO—X'—COOH (2)

In Formula (2), X' is an atomic group having a molecular weight of less than 456, the main chain of which is made up of 1 to 18 atoms. That is, X' is obtained by subtracting the atomic number and molecular weight, which correspond to the —COO— portion, from the main chain of X in the abovementioned Formula (1).

While the lower limit of the molecular weight of the atomic groups represented by X' is not particularly limited, the lower limit of the molecular weight for the case in which X' has the form —CH$_2$— is normally 14. Note that from the viewpoint of polymerizability, it is preferable that the molecular weights of the atomic groups represented by X' be within the ranges described above.

The carboxyl groups contained in the abovementioned Formulae (1) and (2) are present via a spacer from a polymer main chain. As a result, the probability that each carboxyl group is present in close proximity increases and the interaction between functional groups or the interaction between a functional group and an electrode constituting member such as an electrode active material makes it easier to form a chemical or physical crosslinked structure, and the like. As a result, the first fluorine based polymer has improved adhesion between the electrode active material and the current collector.

The first fluorine based polymer having one or more side chains represented by the abovementioned Formula (1) is preferably a fluorine based copolymer obtained by copolymerizing multiple kinds of monomers including fluorine based monomers and compounds represented by the following Formula (3), more preferably a fluorine based copolymer obtained by copolymerizing fluorine based monomers with compounds represented by the following Formula (3).

—X—COOH having compounds represented by the following Formula (3) serves as a side chain represented by the abovementioned Formula (1) in a fluorine based copolymer after copolymerization.

[Chemical formula 1]

(3)

In Formula (3), $R^1$, $R^2$, and $R^3$ are each independently a hydrogen atom, a chlorine atom, or an alkyl group having 1 to 5 carbons. $R^1$, $R^2$, and $R^3$ are more preferably a hydrogen atom or a methyl group, further preferably a hydrogen atom. X is as mentioned above, and preferably X'. The description of X' is as mentioned above.

Specific examples of compounds represented by the abovementioned formula (3) include acryloyloxyethyl succinate in which an atomic group represented by X is —COO—CH$_2$—CH$_2$—O—CO—CH$_2$—CH$_2$—; acryloyloxypropyl succinate in which an atomic group represented by X is —COO—CH$_2$—CH(CH$_3$)—O—CO—CH$_2$—CH$_2$—; 2-carboxyethyl acrylate in which an atomic group represented by X is —COO—CH$_2$—CH$_2$—; and the like.

The first fluorine based polymer has constituent units derived from the compounds represented by Formula (3) of preferably 0.01 to 10 mol %, more preferably 0.05 to 7 mol %, and even more preferably 0.1 to 4 mol %. When the constituent units derived from the compounds represented by the abovementioned Formula (3) are 0.01 mol % or greater, functional groups tend to be adjacent, thereby exerting the desired effects. Moreover, when the constituent units are less than 10 mol %, reduced electrolyte solution resistance can be avoided.

Moreover, the first fluorine based polymer is more preferably a copolymer of vinylidene fluoride and a compound represented by the abovementioned Formula (3).

The first fluorine based polymer preferably has 90 to 99.99 mol %, more preferably 93 to 99.95 mol %, and even more preferably 96 to 99.9 mol %, of constituent units derived from vinylidene fluoride.

Moreover, the first fluorine based polymer may further contain, in addition to the monomers described above, constituent units derived from monomers that are copolymerizable with these, with examples of such monomers including vinyl fluoride, trifluoroethylene, tetrafluoroethylene, chlorotrifluoroethylene, hexafluoropropylene, perfluoroalkyl vinyl ethers represented by perfluoromethyl vinyl ether, (meth)acrylic acid, alkyl (meth)acrylate compounds represented by methyl(meth)acrylate, and the like. Note that the constituent units derived from the monomers in the first fluorine based polymer are preferably 0.01 to 10 mol %.

Note that while methods for copolymerizing the monomers as mentioned above to prepare the first fluorine based polymer are not particularly limited, conventionally known methods such as suspension polymerization, emulsion polymerization, or solution polymerization can be adopted. In suspension polymerization in which water serves as a dispersing medium, a suspending agent such as a cellulose based suspending agent, a polyvinyl alcohol suspending agent, or a polyethylene oxide suspending agent can be used. The usage of a suspending agent can be 0.005 to 1.0 parts by mass, preferably 0.01 to 0.4 parts by mass, with respect to 100 parts by mass of the total monomers such as fluorine based monomers, and compounds represented by Formula (3), along with other monomers that are copolymerized as required.

Examples of polymerization initiators that can be used include diisopropyl peroxy dicarbonate, dinormal propyl peroxy dicarbonate, dinormal heptafluoropropyl peroxy dicarbonate, isobutyl peroxide, di(chlorofluoroacyl)peroxide, di(perfluoroacyl)peroxide, or t-butyl peroxy pivalate, and the like. Usage of the polymerization initiator can be 0.05 to 5 parts by mass, preferably 0.15 to 2 parts by mass, with respect to 100 parts by mass of the total monomers used for copolymerization (fluorine based monomers, and compounds represented by Formula (3), along with other monomers that are copolymerized as required).

Additionally, a chain transfer agent such as ethyl acetate, methyl acetate, diethyl carbonate, acetone, ethanol, n-propanol, acetaldehyde, propylaldehyde, ethyl propionate, or carbon tetrachloride may be added to adjust the degree of polymerization of the first fluorine based polymer. For the case in which a chain transfer agent is used, the usage thereof can be normally 0.1 to 5 parts by mass, preferably 0.5 to 3 parts by mass, with respect to 100 parts by mass of the total monomers used for copolymerization.

Moreover, the charge amount of the total monomers used for copolymerization can be at a ratio of the total mass of monomers: the mass of water of 1:1 to 1:10, preferably 1:2 to 1:5. The polymerization temperature T is appropriately selected according to the 10-hour half-life temperature T10 of the polymerization initiator, and is normally selected within the range of T10−25° C.≤T≤T10+25° C. The pressure during polymerization is normally higher than normal pressure, preferably 2.0 to 8.0 MPa-G Moreover, the constituent units derived from the compounds represented by the abovementioned Formula (3) are divided by a compound represented by Formula (3) during polymerization, and may be gradually added to a polymerization liquid in intervals.

The inherent viscosity (logarithmic viscosity at 30° C. of a solution obtained by dissolving 4 g of resin in 1 liter of N,N-dimethylformamide) of the first fluorine based polymer is preferably within the range of 0.5 to 5.0 dl/g, more preferably within the range of 1.0 to 4.0 dl/g. The inherent viscosity $\eta_i$ can be measured and calculated via the method described in the below-mentioned examples.

Moreover, the first fluorine based polymer has an absorbance ratio $A_R$ (ratio of the absorbance derived from the stretching vibration of carbonyl groups to the absorbance derived from the stretching vibration of CH, measured using an infrared spectrophotometer) of preferably within the range of 0.01 to 5.0, more preferably within the range of 0.05 to 3.0. The absorbance ratio $A_R$ can be measured and calculated via the method described in the below-mentioned examples. The absorbance ratio $A_R$ serves as a standard that indicates the amount of carbonyl groups present in the fluorine based polymer.

Second Fluorine Based Polymer

The electrode mixture in this embodiment preferably contains a second fluorine based polymer having one or more side chains having a hydroxy group, in addition to the abovementioned first fluorine based polymer.

Specific examples of the side chains having a hydroxy group include side chains represented by Formula (4).

—Y—OH    (4)

In Formula (4), Y is —COO—Y'— or —Y'—, Y' is a hydrocarbon having 1 to 8 carbons, or represented by (—CH$_2$—CH$_2$—O—)$_m$(—CH$_2$—CH(CH$_3$)—O—)$_n$, both m and n are integers including 0, and m+n≤10. Note that "(—CH$_2$—CH$_2$—O—)$_m$(—CH$_2$—CH(CH$_3$)—O—)$_n$" indicates that m (—CH$_2$—CH$_2$—O—) and n (—CH$_2$—CH(CH$_3$)—O—) are randomly bound. Y is preferably —COO—Y'—. Moreover, for the case in which Y' is a hydrocarbon having 1 to 3 carbons, or represented by (—CH$_2$—CH$_2$—O—)$_m$(—CH$_2$—CH(CH$_3$)—O—)$_n$, it is preferable that m+n≤6. Moreover, the hydrocarbon is preferably an alkyl group.

For the case in which a second fluorine based polymer is used in addition to the first fluorine based polymer, the interaction between a hydroxyl group contained in the second fluorine based polymer and a carboxyl group of Formula (1) contained in the first fluorine based polymer or the interaction between a functional group and an electrode constituting member such as an electrode active material allows a chemical and physical crosslinked structure, and the like to be formed. As a result, a mixture of the first fluorine based polymer and the second fluorine based polymer has improved adhesion between the electrode active material and the current collector.

The second fluorine based polymer having side chains represented by the abovementioned Formula (4) is preferably a fluorine based copolymer obtained by copolymerizing fluorine based monomers with multiple kinds of monomers including compounds represented by the following Formula (5). —Y—OH having a compound represented by the following Formula (5) serves as a side chain represented by Formula (4) in a fluorine based copolymer after copolymerization.

[Chemical formula 2]

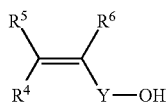

(5)

In Formula (5), $R^4$, $R^5$, and $R^6$ are each independently a hydrogen atom or an alkyl group having 1 to 3 carbons. $R^4$, $R^5$, and $R^6$ are more preferably a hydrogen atom or a methyl group, further preferably a hydrogen atom. The description of Y is as mentioned above.

Specific examples of the compounds represented by the abovementioned Formula (5) include 2-hydroxyethyl acrylate in which an atomic group represented by Y is —COO—CH$_2$—CH$_2$—; hydroxypropyl acrylate in which an atomic group represented by Y is —COO—CH$_2$—CH(CH$_3$)— or —COO—CH(CH$_3$)—CH$_2$—; and the like.

The second fluorine based polymer has constituent units derived from the compounds represented by Formula (5) of preferably 0.01 to 5 mol %, more preferably 0.05 to 4 mol %, and even more preferably 0.1 to 3 mol %.

Moreover, the second fluorine based polymer is more preferably a fluorine based copolymer obtained by copolymerizing fluorine based monomers with a compound represented by Formula (5).

Moreover, the second fluorine based polymer is preferably a vinylidene fluoride based copolymer obtained by copolymerizing multiple kinds of monomers including vinylidene fluoride, more preferably a copolymer of vinylidene fluoride and a compound represented by the abovementioned Formula (5).

The second fluorine based polymer preferably has 95 to 99.99 mol %, more preferably 96 to 99.95 mol %, and even more preferably 97 to 99.9 mol %, of constituent units derived from vinylidene fluoride.

Moreover, the second fluorine based polymer may further contain, in addition to the abovementioned monomers, constituent units derived from monomers that are copolymerizable therewith, with examples of such monomers including those monomers exemplified in the first fluorine based polymer. Moreover, examples thereof may further contain compounds represented by Formula (3).

The same methods as in the abovementioned first fluorine based polymer can be used as methods for polymerizing the second fluorine based polymer, while the same quantity of the same suspending agent, polymerization initiator, and chain transfer agent can be used as an additive.

The second fluorine based polymer has an inherent viscosity preferably within the range of 0.5 to 5.0 dl/g, more preferably within the range of 1.0 to 4.0 dl/g. The inherent viscosity $\eta_i$ can be measured and calculated via the method described in the below-mentioned examples.

Moreover, the second fluorine based polymer has an absorbance ratio $A_R$ preferably within the range of 0.01 to 5.0, more preferably within the range of 0.05 to 3.0. The absorbance ratio $A_R$ can be measured and calculated via the method described in the below-mentioned examples.

Moreover, for the case in which the first fluorine based polymer and the second fluorine based polymer are used for the electrode mixture, the mixing ratio of the first fluorine based polymer to the second fluorine based polymer is preferably 99.5 to 50:0.5 to 50, more preferably 99 to 65: 1 to 35, and even more preferably 99 to 75: 1 to 25.

Electrode Active Material

As the electrode active material contained in the electrode mixture in this embodiment, for example, conventionally known anode electrode active materials and cathode electrode active materials can be used. Examples of anode active materials include carbon materials, metal/alloy materials, and metal oxides.

Moreover, a lithium based cathode active material containing at least lithium is preferable as a cathode active material. Examples of lithium based cathode active materials include composite metal chalcogen compounds represented by the general formula LiMY$_2$ (wherein M is at least one of transition metals such as Co, Ni, Fe, Mn, Cr, or V, and Y is a chalcogen element such as O or S) such as LiCoO$_2$ or LiNi$_x$Co$_{1-x}$O$_2$ (0≤x≤1), composite metal oxides assuming a spinel structure such as LiMn$_2$O$_4$, and olivine type lithium compounds such as LiFePO$_4$. The specific surface area of the cathode active material is preferably 0.05 to 50 m$^2$/g, more preferably 0.1 to 30 m$^2$/g.

The specific surface area of the electrode active materials can be determined by a nitrogen adsorption method.

Generally, fluorine based polymers such as a vinylidene fluoride polymer have weak adhesion to electrode active materials having a large specific surface area; however, when the first fluorine based polymer or the mixture of the first fluorine based polymer and the second fluorine based polymer according to this embodiment is subjected to heat treatment, the adhesion can also be improved to electrode active materials having a specific surface area. For this reason, even when an anode electrode active material and a cathode electrode active material which are contained in the abovementioned electrode mixture is an electrode active material having a specific surface area of 0.5 m$^2$/g or greater, 3.0 m$^2$/g or greater, and further, 10.0 m$^2$/g or greater, it can be suitably used.

While not limited thereto, examples of the electrode active material contained in the electrode mixture and having a large specific surface area in this embodiment include lithium iron phosphate as the cathode active material, and the like, as well as lithium titanate as the anode electrode active material, and the like.

In the electrode mixture, for every 100 parts by mass of the first fluorine based polymer, the second fluorine based polymer that is appropriately used, and the electrode active material, the total of the first fluorine based polymer and the second fluorine based polymer is preferably 0.5 to 15 parts by mass, more preferably 1 to 10 parts by mass, while the electrode active material is preferably 85 to 99.5 parts by mass, more preferably 90 to 99 parts by mass.

Solvent

The solvent contained in the electrode mixture in this embodiment is preferably a nonaqueous solvent. The nonaqueous solvent is preferably a solvent exhibiting polarity. Examples of the nonaqueous solvent include N-methyl-2-pyrolidone, N,N-dimethylformamide, N,N-dimethyl acetamide, dimethyl sulfoxide, hexamethylphosphoamide, dioxane, tetrahydrofuran, tetramethylurea, triethyl phosphate, trimethyl phosphate, acetone, cyclohexanone, and the like, with N-methyl-2-pyrolidone, N,N-dimethylformamide, N,N-dimethyl acetamide, or dimethyl sulfoxide preferable from the viewpoint of solubility of the fluorine based polymer. However, while not limited thereto, a conventionally known nonaqueous solvent can be used as long as it is a nonaqueous solvent exhibiting polarity. Moreover, the electrode mixture may contain one solvent or may contain two or more solvents.

The content of the solvent in the electrode mixture in this embodiment is preferably 20 to 300 parts by mass, more preferably 30 to 200 parts by mass, with respect to 100 parts by mass of the total of the first fluorine based polymer, the second fluorine based polymer that is appropriately used, and the electrode active material.

The electrode mixture in this embodiment is produced by mixing the first fluorine based polymer, the electrode active material, and the solvent, and appropriately the second fluorine based polymer as required. While the addition order, mixing method, and the like are not particularly limited, each of the abovementioned materials may be appropriately added and mixed such that the electrode mixture becomes a homogeneous slurry.

For the case in which the viscosity of the electrode mixture is measured at 25° C. at a shear rate of $2 \text{ s}^{-1}$ using an E type viscometer, it is preferably 2000 to 50000 mPa·s, more preferably 5000 to 30000 mPa·s.

Other Components Contained in the Electrode Mixture

Moreover, the electrode mixture may contain components other than those mentioned above, with examples thereof including conductive assistants such as carbon black, carbon fibers, and carbon nanotubes, pigment dispersants such as polyvinyl pyrolidone, and the like. Moreover, the electrode mixture may contain other polymers, in addition to the first fluorine based polymer and the second fluorine based polymer. While not limited thereto, exemplary polymers include vinylidene fluoride based polymers such as polyvinylidene fluoride, a vinylidene fluoride-hexafluoropropylene copolymer, a vinylidene fluoride-trifluoroethylene copolymer, a vinylidene fluoride-chlorotrifluoroethylene copolymer, a vinylidene fluoride-perfluoromethyl vinyl ether copolymer, a vinylidene fluoride-tetrafluoroethylene copolymer, and a vinylidene fluoride-tetrafluoroethylene-hexafluoropropylene copolymer.

For the case in which the electrode mixture in this embodiment contains other polymers, in addition to the first fluorine based polymer and the second fluorine based polymer, the polymer is preferably contained in an amount less than 25 parts by mass, with respect to 100 parts by mass of the abovementioned fluorine based polymer.

Current Collector

As the current collector used for the electrode structural body in this embodiment, current collectors, and the like generally used in the art can be used, with examples of anode current collectors including copper, and the like, and examples of cathode current collectors including aluminum, and the like. Moreover, examples of the form of the current collector include a metal foil, a metal net, and the like. However, while not limited thereto, the kind and form may be appropriately selected according to application, and the like; however, for the case in which the current collector is used for a cathode of a nonaqueous electrolyte secondary battery, it is preferably an aluminum foil. Moreover, the thickness of the current collector is preferably 5 to 100 μm, more preferably 5 to 20 μm.

Production Method of an Electrode Structural Body

The electrode structural body in this embodiment is manufactured using the abovementioned electrode mixture and current collector.

As the first step of the method for producing the electrode structural body in this embodiment, the electrode mixture is applied onto one face, preferably both faces of the current collector. As application methods, for example, known methods in the art can be used, wherein the application may be carried out using a bar coater, a die coater, a comma coater, and the like. The basis weight of the electrode mixture is normally preferably 20 to 700 $g/m^2$, more preferably 30 to 500 $g/m^2$.

Note that for the case of application onto one face of the current collector, an electrode structural body having a two-layer structure is obtained as the final product. Moreover, for the case of application onto both faces of the current collector, an electrode structural body having a three-layer structure is obtained as the final product.

As the next step, the current collector with the electrode mixture applied thereon is dried. The drying step may be appropriately carried out such that, for example, the temperature at the time of drying is within the range of 50 to 150° C. while the period of drying is within the range of 1 to 300 minutes. Moreover, while the pressure at the time of drying is not particularly limited, drying is preferably performed at atmospheric pressure or reduced pressure. In this step, the solvent is removed and a coated film including an electrode active material and a fluorine based polymer is formed on the surface of the current collector. This coated film is adhered to the current collector and may have a certain degree of peel strength.

The thickness of the coated film on the electrode structural body is normally preferably 20 to 250 μm, more preferably 20 to 150 μm.

In this embodiment, the coated film is subjected to heat treatment after drying. The temperature in the heat treatment step is, for example, within the range of 100° C. to a temperature lower than the melting point of the fluorine based resin, preferably within the range of 110° C. to a temperature that is −10° C. from the melting point of the fluorine resin, more preferably within the range of 120° C. to a temperature that is −20° C. from the melting point of the fluorine resin. Moreover, the period of the heat treatment step is, for example, 1 to 500 minutes, preferably 5 to 400 minutes, more preferably 10 to 350 minutes. For the case in which such heat treatment allows each carboxyl group contained in the abovementioned first fluorine based polymer to have an interaction between functional groups or an interaction between a functional group and an electrode constituting member such as an electrode active material, thereby allowing a chemical or physical crosslinked structure, and the like to be formed, the adhesion between the fluorine based polymer and the electrode active material contained in the coated film, along with the adhesion between the fluorine based polymer and the current collector, can be improved. Moreover, also for the case in which the interaction between a carboxyl group of the first fluorine based polymer and a hydroxyl group of the second fluorine based polymer or the interaction between a functional group and an electrode constituting member such as an electrode active material allows a chemical or physical crosslinked structure, and the like to be formed, the same effects are exerted. As a result, even for the case in which an electrode structural body is manufactured using an electrode mixture containing an electrode active material having a specific surface area of 0.5 $m^2/g$ or greater, the heat treatment allows the abovementioned adhesion to be further improved. The change rate of the peel strength between the coated film and the current collector before heat treatment and after heat treatment ((peel strength after heat treatment−peel strength after drying)/peel strength after drying) may be, for example, 0.3 to 1.2, and may be 0.55 to 1.2.

Thus, in this embodiment, heat treatment allows the adhesion to be improved. Accordingly, compared with methods using special additives, methods involving complicated steps, and the like, adhesion can be more easily improved.

Battery

The electrode structural body manufactured as mentioned above is suitably used for batteries. While the battery producing method is not particularly limited, batteries may be manufactured via conventionally known methods. Moreover, if the current collector and the electrode active material contained in the electrode structural body are functionally suitably used, while the kind of battery is not limited, the battery including the electrode structural body of the present invention is preferably a nonaqueous electrolyte secondary battery.

In an electrode structural body according to the present invention, a coated film is obtained by applying an electrode mixture including an electrode active material, a first fluorine based polymer, and a solvent and drying the mixture, then formed on the surface of a current collector, the first fluorine based polymer has one or more side chains represented by the following Formula (1), and the coated film is subjected to heat treatment.

—X—COOH                            (1)

(In Formula (1), X is an atomic group having a molecular weight of less than 500, the main chain of which is made up of 1 to 20 atoms.)

In the electrode structural body according to the present invention, the solvent is preferably a nonaqueous solvent.

In the electrode structural body according to the present invention, the electrode active material may have a specific surface area of 0.5 m$^2$/g or greater.

In the electrode structural body according to the present invention, the electrode mixture preferably further includes a second fluorine based polymer having one or more side chains having a hydroxy group.

In the electrode structural body according to the present invention, the side chains represented by the abovementioned Formula (1) are preferably side chains represented by the following Formula (2).

—COO—X'—COOH                    (2)

(In Formula (2), X' is an atomic group having a molecular weight of less than 456, the main chain of which is made up of 1 to 18 atoms.)

In the electrode structural body according to the present invention, the first fluorine based polymer is preferably a fluorine based copolymer obtained by copolymerizing fluorine based monomers with at least one selected from 2-carboxyethyl acrylate, acryloyloxyethyl succinate, and acryloyloxypropyl succinate.

In the electrode structural body according to the present invention, the second fluorine based polymer is preferably a fluorine based copolymer obtained by copolymerizing fluorine based monomers with 2-hydroxyethyl acrylate and/or hydroxypropyl acrylate.

In the electrode structural body according to the present invention, the current collector is preferably an aluminum foil.

The battery according to the present invention includes any of the abovementioned electrode structural bodies.

A method for producing an electrode structural body according to the present invention includes: a step of applying an electrode mixture including an electrode active material, a first fluorine based polymer, and a solvent onto the surface of a current collector and drying the mixture, to form a coated film on the surface of the current collector; and a step of subjecting the coated film after drying to heat treatment, wherein the first fluorine based polymer has one or more side chains represented by the following Formula (1).

—X—COOH                            (1)

(In Formula (1), X is an atomic group having a molecular weight of less than 500, the main chain of which is made up of 1 to 20 atoms.)

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

As described below, various fluorine based polymers were produced and an electrode mixture manufactured therewith. Further, an electrode was manufactured using the manufactured electrode mixture and a peeling test was carried out.

First, the inherent viscosity $\eta_i$ of the polymer produced in the production example of each fluorine based polymer, as well as the definition and measurement method of the absorbance ratio $A_R$, which serves as the standard indicating the amount of carbonyl groups present in the polymer, will be described.

Inherent Viscosity $\eta_i$

In order to calculate the inherent viscosity $\eta_i$, 80 mg of the polymer prepared in each production example is dissolved in 20 ml of N, N-dimethylformamide to manufacture a polymer solution. The viscosity $\eta$ of the polymer solution is measured in a thermostatic bath at 30° C. using an Ubbelohde viscometer. Moreover, the inherent viscosity i is determined by the following Formula (6) using the viscosity $\eta$.

$$\eta_i = (1/C) \cdot \ln(\eta/\eta_0) \tag{6}$$

In Formula (6), $\eta_0$ is the viscosity of the solvent, which is N,N-dimethylformamide, and C is 0.4 g/dl.

Absorbance Ratio $A_R$

The absorbance ratio $A_R$ serves as the standard indicating the amount of carbonyl groups present in the polymer, with the infrared absorption spectrum of the polymer prepared in each production example measured in order to determine this $A_R$. Specifically, the polymer is thermally pressed at 230° C. to manufacture a 30 mm×30 mm press sheet. The IR spectrum of the press sheet is measured at a wavelength within the range of 1500 cm$^{-1}$ to 4000 cm$^{-1}$ using an infrared spectrophotometer FT-730 (produced by Horiba, Ltd.). Moreover, the absorbance ratio $A_R$ is determined by the following Formula (7) using the absorbance obtained by the abovementioned measurement.

$$A_R = A_{1700-1800}/A_{3025} \tag{7}$$

In Formula (7), $A_{1700-1800}$ is the absorbance derived from the stretching vibration of carbonyl groups detected at a wavelength within the range of 1700 cm$^{-1}$ to 1800 cm$^{-1}$, while $A_{3025}$ is the absorbance derived from the stretching vibration of CH detected at a wavelength of approximately 3025 cm$^{-1}$.

Production Example 1 of the Fluorine Based Polymer

In Production Example 1, a fluorine based copolymer (polymer A) was produced as a first fluorine based polymer as follows.

900 g of ion exchanged water, 0.4 g of Metolose 90SH-100 (produced by Shin-Etsu Chemical Co., Ltd.) as a cellulose based suspending agent, 8.5 g of a 50 wt. % t-butylperoxypivalate-fron 225cb solution, 400 g of vinylidene fluoride, and 0.2 g of acryloyloxyethyl succinate were charged in an autoclave having an internal capacity of 2 liters and the temperature was raised to 50° C. over a period of 2 hours.

Subsequently, a 0.65 wt. % acryloyloxyethyl succinate aqueous solution was gradually added at a rate such that the pressure polymerization became constant while the temperature was maintained at 50° C. A total of 3.4 g of acryloyloxyethyl succinate was added, including the initially added amount. Polymerization was ceased at the same time that the addition of acryloyloxyethyl succinate aqueous solution ended, and the time from when the temperature started rising to the cessation of polymerization was 6.3 hours in total. Upon completion of polymerization, the polymer slurry was subjected to heat treatment at 95° C. for 60 minutes, then dehydrated, washed, and further dried at 80° C. for 20 hours to obtain a polymer powder (polymer A). The yield of polymer A was 64%, the inherent viscosity m was 1.78 dl/g, and the absorbance ratio $A_R$ was 0.58.

Production Example 2 of the Fluorine Based Polymer

In Production Example 2, a fluorine based copolymer (polymer B) was produced as a first fluorine based polymer as follows.

1050 g of ion exchanged water, 0.8 g of Metolose SM-100 (produced by Shin-Etsu Chemical Co., Ltd.), 3.8 g of a 50 wt. % isopropyl peroxide-fron 225cb solution, 400 g of vinylidene fluoride, and 0.4 g of 2-carboxyethyl acrylate were charged in an autoclave having an internal capacity of 2 liters and the temperature was raised to 29° C. over a period of 1 hour.

Subsequently, a 15 wt. % 2-carboxyethyl acrylate aqueous solution was gradually added at a rate of 0.02 g/min while the temperature was maintained at 29° C. A total of 3.1 g of 2-carboxyethyl acrylate was added, including the initially added amount. Polymerization was ceased at the same time as the addition of 2-carboxyethyl acrylate aqueous solution ended, and the time from when the temperature started rising to the cessation of polymerization was 16 hours in total. Upon completion of polymerization, the polymer slurry was subjected to heat treatment at 95° C. for 60 minutes, then dehydrated, washed, and further dried at 80° C. for 20 hours to obtain a polymer powder (polymer B). The yield of polymer B was 74%, the inherent viscosity $\eta_i$ was 2.45 dl/g, and the absorbance ratio $A_R$ was 0.36.

Production Example 3 of the Fluorine Based Polymer

In Production Example 3, a fluorine based copolymer (polymer C) was produced as a first fluorine based polymer as follows.

1050 g of ion exchanged water, 0.4 g of Metolose SM-100 (produced by Shin-Etsu Chemical Co., Ltd.), 3.2 g of ethyl acetate as a chain transfer agent, 3.0 g of a 50 wt. % isopropyl peroxide-fron 225 cb solution, 400 g of vinylidene fluoride, and 0.1 g of acryloyloxypropyl succinate were charged in an autoclave having an internal capacity of 2 liters and the temperature was raised to 26° C. over a period of 1 hour.

Subsequently, a 5 wt. % acryloyloxypropyl succinate aqueous solution was gradually added at a rate of 0.1 g/min while the temperature was maintained at 26° C. A total of 3.8 g of acryloyloxypropyl succinate was added, including the initially added amount. Polymerization was ceased at the same time as the addition of acryloyloxypropyl succinate aqueous solution ended, and the time from when the temperature started rising to the cessation of polymerization was 14.8 hours in total. Upon completion of polymerization, the polymer slurry was subjected to heat treatment at 95° C. for 60 minutes, then dehydrated, washed, and further dried at 80° C. for 20 hours to obtain a polymer powder (polymer C). The yield of polymer C was 58%, the inherent viscosity $\eta_i$ was 1.82 dl/g, and the absorbance ratio $A_R$ was 0.52.

Production Example 4 of the Fluorine Based Polymer

In Production Example 4, a fluorine based copolymer (polymer D) corresponding to neither the first fluorine based polymer nor the second fluorine based polymer was produced as follows.

900 g of ion exchanged water, 0.6 g of Metolose SM-100 (produced by Shin-Etsu Chemical Co., Ltd.), 4.0 g of a 50 wt. % isopropyl peroxide-fron 225cb solution, and 400 g of vinylidene fluoride were charged in an autoclave having an internal capacity of 2 liters, and the temperature was raised to 26° C. over a period of 1 hour.

Subsequently, a 2 wt. % acrylic acid aqueous solution was gradually added at a rate of 0.1 g/min while the temperature was maintained at 29° C. A total of 1.0 g of acrylic acid was added. Polymerization was ceased at the same time as the addition of acrylic acid aqueous solution ended, and the time from when the temperature started rising to the cessation of polymerization was 9.2 hours in total. Upon completion of polymerization, the polymer slurry was subjected to heat treatment at 95° C. for 60 minutes, then dehydrated, washed, and further dried at 80° C. for 20 hours to obtain a polymer powder (polymer D). The yield of polymer D was 35%, the inherent viscosity $\eta_i$ was 1.67 dl/g, and the absorbance ratio ($A_R$) was 0.41.

Production Example 5 of the Fluorine Based Polymer

In Production Example 5, a fluorine based copolymer (polymer E) was produced as a second fluorine based polymer as follows.

900 g of ion exchanged water, 0.4 g of Metolose 90SH-100 (produced by Shin-Etsu Chemical Co., Ltd.), 1.2 g of a 50 wt. % t-butylperoxypivalate-fron 225 cb solution, 400 g of vinylidene fluoride, and 0.2 g of 2-hydroxyethyl acrylate were charged in an autoclave having an internal capacity of 2 liters, and the temperature was raised to 50° C. over a period of 2 hours.

Subsequently, a 0.45 wt. % 2-hydroxyethyl acrylate aqueous solution was gradually added at a rate such that the pressure polymerization became constant while the temperature was maintained at 50° C. A total of 2.0 g of 2-hydroxyethyl acrylate was added, including the initially added amount. Polymerization was ceased at the same time as the addition of 2-hydroxyethyl acrylate aqueous solution ended, and the time from when the temperature started rising to the cessation of polymerization was 15.3 hours in total. Upon completion of polymerization, the polymer slurry was subjected to heat treatment at 95° C. for 60 minutes, then dehydrated, washed, and further dried at 80° C. for 20 hours to obtain a polymer powder (polymer E). The yield of polymer E was 60%, the inherent viscosity m was 1.77 dl/g, and the absorbance ratio $A_R$ was 0.29.

Production Example 6 of the Fluorine Based Polymer

In Production Example 6, a fluorine based homopolymer (polymer F) was produced as follows.

1000 g of ion exchanged water, 0.2 g of Metolose SM-100 (produced by Shin-Etsu Chemical Co., Ltd.), 2.8 g of a 50 wt. % isopropyl peroxide-fron 225cb solution, and 400 g of vinylidene fluoride were charged in an autoclave having an internal capacity of 2 liters, and the temperature was raised to 26° C. over a period of 1 hour.

Subsequently, polymerization was performed for a total of 20 hours from the start of temperature rising while the temperature was maintained at 26° C. Upon completion of polymerization, the polymer slurry was subjected to heat treatment at 95° C. for 60 minutes, then dehydrated, washed, and further dried at 80° C. for 20 hours to obtain a polymer powder (polymer F). The yield of polymer F was 90%, and the inherent viscosity $\eta_i$ was 1.61 dl/g.

Manufacturing Example 1 of the Electrode Structural Body 100 parts by mass of lithium iron phosphate (specific surface area: 11.3 m$^2$/g), 4 parts by mass of carbon black, and 6 parts by mass of any of polymers A to C were dispersed in N-methyl-2-pyrolidone to prepare a cathode electrode mixture in the form of a slurry. Note that for the case in which the addition amount of N-methyl-2-pyrolidone was appropriately adjusted in accordance with the inherent viscosity of the fluorine based polymer, and measured at 25° C. at a shear rate of 2 s$^{-1}$ using an E type viscometer, the viscosity of the mixture was adjusted to 5000 to 30000 mPa·s.

The abovementioned electrode mixture was applied onto a current collector of an Al foil having a thickness of 15 μm using a bar coater, and dried at 110° C. for 30 minutes to manufacture a current collector including a coated film having a basis weight of 120 g/m$^2$ on only one face thereof.

The current collector including the coated film was subjected to heat treatment at 130° C. for 5 hours to obtain an electrode structural body (Examples 1 to 3).

Moreover, in order to manufacture a fluorine based polymer having side chains represented by the abovementioned Formula (1), along with an electrode structural body using a fluorine based polymer having hydroxyl groups as side chains, polymer B and polymer E, which were mixed at a mass ratio of 5:1, were used as polymer powders for preparing an electrode mixture to manufacture an electrode structural body by the same method as above. (Example 9)

Moreover, any one of polymers D to F was used instead of polymers A to C to manufacture an electrode structural body by the same method as above (Comparative Examples 1, 2, and 8).

Moreover, polymer D and polymer E, which were mixed at a mass ratio of 5:1, were used as polymer powders for preparing an electrode mixture to manufacture an electrode structural body by the same method as above (Comparative Example 7).

Manufacturing Example 2 of the Electrode Structural Body 100 parts by weight of lithium titanate (specific surface area: 3.2 m$^2$/g), 6 parts by mass of carbon black, and 8 parts by mass of a polymer powder of any of polymers A to C were dispersed in N-methyl-2-pyrolidone to prepare an anode electrode mixture in the form of a slurry. Note that for the case in which the addition amount of N-methyl-2-pyrolidone was appropriately adjusted in accordance with the inherent viscosity of the fluorine based polymer, and measured at 25° C. at a shear rate of 2 s$^{-1}$ using an E type viscometer, the viscosity of the mixture was adjusted to 5000 to 30000 mPa·s.

The abovementioned electrode mixture was applied onto a current collector of an Al foil having a thickness of 15 μm using a bar coater, and dried at 110° C. for 30 minutes to manufacture a current collector including a coated film having a basis weight of 160 g/m$^2$ on only one face thereof.

The current collector including the coated film was subjected to heat treatment at 130° C. for 5 hours to obtain an electrode structural body (Examples 4 to 6).

Moreover, polymer D or F was used instead of polymers A to C to manufacture an electrode structural body by the same method as above (Comparative Examples 3, 4).

Manufacturing Example 3 of the Electrode Structural Body 100 parts by weight of lithium cobaltate (specific surface area: 0.2 m$^2$/g), 2 parts by mass of carbon black, and 1.5 parts by mass of polymer A or B were dispersed in N-methyl-2-pyrolidone to prepare an anode electrode mixture in the form of a slurry. Note that for the case in which the addition amount of N-methyl-2-pyrolidone was appropriately adjusted in accordance with the inherent viscosity of the fluorine based polymer, and measured at 25° C. at a shear rate of 2 s$^{-1}$ using an E type viscometer, the viscosity of the mixture was adjusted to 5000 to 30000 mPa·s.

The abovementioned electrode mixture was applied onto a current collector of an Al foil having a thickness of 15 μm using a bar coater, and dried at 110° C. for 30 minutes to manufacture a current collector including a coated film having a basis weight of 240 g/m$^2$ on only one face thereof.

The current collector including the coated film was subjected to heat treatment at 130° C. for 5 hours to obtain an electrode structural body (Examples 7, 8).

Moreover, polymer D or F was used instead of polymers A and B to manufacture an electrode structural body by the same method as above (Comparative Examples 5, 6).

Peeling Test

Regarding each electrode structural body obtained above, the peel strength between the coated film and the current collector was measured. First, the electrode structural body was cut to a length of 50 mm and a width of 20 mm. Moreover, regarding the cut electrode structural body, a 180-degree peeling test was conducted at a head rate of 200 mm/min using a tensile testing machine ("STA-1150 UNIVERSAL TESTING MACHINE" manufactured by ORIENTEC Co., Ltd.), in order to measure the peel strength between the coated film and the current collector.

Table 1 shows the peel strength (gf/mm) after drying and after heat treatment, along with the change rate ((peel strength after heat treatment—peel strength after drying)/peel strength after drying) thereof, in each electrode structural body manufactured above. Note that as the change rate increases, the electrode structural body has enhanced peel strength via heat treatment, along with improved adhesion between the coated film and the current collector.

Moreover, for the case in which polymer B and polymer E were mixed, compared with the case in which polymer B alone and polymer E alone were used, the peel strength and peel strength change rate after heat treatment were more improved (Examples 2, 9, Comparative Example 8).

For the case in which polymer B and polymer E were mixed, compared with the case in which polymer D and polymer E were mixed, the peel strength and the peel strength change rate were more improved (Example 9, Comparative Example 7). This is presumably because, when the main chain of X contained in polymer B in Formula (1) serves as a spacer, improving the degree of freedom of the arrangement of a carboxyl group at the edge portion thereof, the carboxyl group tends to be crosslinked with a hydroxyl group contained in polymer E.

Moreover, polymer F, which is a homopolymer, has a low absolute value of the peel strength with any electrode active

TABLE 1

| | Electrode active material (Specific surface area m²/g) | Copolymer | Peel strength (gf/mm) After drying | Peel strength (gf/mm) After heat treatment | Peel strength change rate |
|---|---|---|---|---|---|
| Example 1 | LFP (11.3) | Polymer A | 2.16 | 4.20 | 0.94 |
| Example 2 | | Polymer B | 3.32 | 5.36 | 0.61 |
| Example 3 | | Polymer C | 1.83 | 3.12 | 0.7 |
| Comparative Example 1 | | Polymer D | 2.24 | 2.73 | 0.22 |
| Comparative Example 2 | | Polymer F | 0.80 | 1.03 | 0.29 |
| Example 4 | LTO (3.2) | Polymer A | 2.37 | 4.37 | 0.84 |
| Example 5 | | Polymer B | 3.10 | 5.79 | 0.87 |
| Example 6 | | Polymer C | 2.54 | 4.01 | 0.58 |
| Comparative Example 3 | | Polymer D | 1.17 | 1.63 | 0.39 |
| Comparative Example 4 | | Polymer F | 0.74 | 0.92 | 0.24 |
| Example 7 | LCO (0.2) | Polymer A | 2.82 | 4.68 | 0.66 |
| Example 8 | | Polymer B | 3.47 | 5.52 | 0.59 |
| Comparative Example 5 | | Polymer D | 1.60 | 2.42 | 0.51 |
| Comparative Example 6 | | Polymer F | 0.36 | 0.39 | 0.08 |
| Example 9 | LFP (11.3) | Polymer B:polymer E = 5:1 | 3.26 | 6.17 | 0.89 |
| Comparative Example 7 | | Polymer D:polymer E = 5:1 | 1.83 | 2.22 | 0.21 |
| Comparative Example 8 | | Polymer E | 0.59 | 0.72 | 0.22 |

Hereinafter, comparing each of the peel strength and the peel strength change rate obtained in the abovementioned examples and comparative examples, the adhesion between the coated film and the current collector in the electrode structural body of the present invention will be examined.

Table 1 shows that in the copolymer prepared in this example, polymers A, B, and C which have X in Formula (1) have improved adhesion without depending on the specific surface area, compared with polymers D and F which do not have the abovementioned X (Examples 1 to 8, Comparative Examples 1 to 6). Moreover, the peel strength change rate of polymers A, B, and C which have X in Formula (1), compared with polymer D which does not have the abovementioned X, remained high even when the specific surface area of the electrode active material increased (Examples 1 to 6, Comparative Examples 1, 3, 5).

material, presumably necessitating an increase in the usage of polymer F in order to obtain the desired strength (Comparative Examples 2, 4, 6).

INDUSTRIAL APPLICABILITY

The present invention is applicable to the production of batteries including a current collector and an electrode active material.

The invention claimed is:

1. An electrode structural body, comprising a coated film formed on a surface of a current collector, wherein the coated film is obtained by applying an electrode mixture including an electrode active material, a first fluorine based polymer, a second fluorine based polymer having one or more side chains having a hydroxy group, and a solvent onto the surface of the current collector, drying the mixture, and subjecting to heat treatment, wherein the first fluorine based polymer having one or more side chains represented by Formula (1), $$—X—COOH \quad (1),$$

where X is an atomic group having a molecular weight of less than 500, a main chain of which is made up of 1 to 20 atoms.

2. The electrode structural body according to claim 1, wherein the solvent is a nonaqueous solvent.

3. The electrode structural body according to claim 1, wherein the electrode active material has a specific surface area of 0.5 m²/g or greater.

4. The electrode structural body according to claim 1, wherein the one or more side chains having a hydroxy group comprise side chains represented by formula (4), $$—Y—OH \quad (4),$$

wherein Y is —COO—Y'— or —Y'—, Y' being a hydrocarbon having 1 to 8 carbons, or represented by $(—CH_2—CH_2—O—)_m(—CH_2—CH(CH_3)—O—)_n$, wherein both m and n are integers including 0, and (m+n)≤10.

5. The electrode structural body according to claim 1, wherein the side chains represented by Formula (1) are side chains represented by Formula (2):

$$—COO—X'—COOH \quad (2),$$

where X' is an atomic group having a molecular weight of less than 456, the main chain of which is made up of 1 to 18 atoms.

6. The electrode structural body according to claim 1, wherein the first fluorine based polymer is a fluorine based copolymer obtained by copolymerizing fluorine based monomers with at least one selected from 2-carboxyethyl acrylate, acryloyloxyethyl succinate, and acryloyloxypropyl succinate.

7. The electrode structural body according to claim 1, wherein the second fluorine based polymer is a fluorine based copolymer obtained by copolymerizing fluorine based monomers with 2-hydroxyethyl acrylate and/or hydroxypropyl acrylate.

8. The electrode structural body according to claim 1, wherein the current collector is an aluminum foil.

9. A battery comprising an electrode structural body according to claim 1.

10. A method for producing an electrode structural body, comprising:

a step of applying an electrode mixture including an electrode active material, a first fluorine based polymer, a second fluorine based polymer having one or more side chains having a hydroxy group, and a nonaqueous solvent onto the surface of a current collector and drying the mixture, to form a coated film on the surface of the current collector; and a step of subjecting the coated film after drying to heat treatment, wherein the first fluorine based polymer has one or more side chains represented by Formula (1):

$$—X—COOH \quad (1),$$

where X is an atomic group having a molecular weight of less than 500, the main chain of which is made up of 1 to 20 atoms.

* * * * *